United States Patent [19]
Furuta et al.

[11] Patent Number: 5,767,195
[45] Date of Patent: Jun. 16, 1998

[54] LIQUID CRYSTAL POLYESTER RESIN COMPOSITION

[75] Inventors: Motonubu Furuta, Chiba; Takanari Yamaguchi, Tsukuba, both of Japan

[73] Assignee: Sumitomo Chemical Company, Limited, Osaka, Japan

[21] Appl. No.: 787,159

[22] Filed: Jan. 23, 1997

Related U.S. Application Data

[63] Continuation of Ser. No. 405,186, Mar. 16, 1995, abandoned.

[30] Foreign Application Priority Data

Mar. 16, 1994 [JP] Japan ................... 6-045722

[51] Int. Cl.$^6$ .................. C08G 63/12; C08L 67/04
[52] U.S. Cl. .............. 525/68; 525/132; 525/176; 525/190
[58] Field of Search ............... 525/68, 132, 196, 525/190

[56] References Cited

U.S. PATENT DOCUMENTS

| | | | |
|---|---|---|---|
| 4,764,556 | 8/1988 | Lausberg et al. | 525/67 |
| 4,914,152 | 4/1990 | Miyashita et al. | 525/68 |
| 5,216,073 | 6/1993 | Haider et al. | 525/176 |
| 5,242,981 | 9/1993 | Izumi et al. | 525/68 |

FOREIGN PATENT DOCUMENTS

| | | |
|---|---|---|
| 0247465 | 12/1987 | European Pat. Off. . |
| 0380112 | 8/1990 | European Pat. Off. . |
| 0472898 | 3/1992 | European Pat. Off. . |
| 0595082 | 5/1994 | European Pat. Off. . |

OTHER PUBLICATIONS

Chem. Abst., 116:42639, No. 6, Feb. 1992. & JP 3 220 260, Sep. 27, 1991.
Chem. Abst., 117:28004, No. 4, Jul. 1992 & JP 4 028 743, Jan. 31, 1992.
Chem. Abst., 119:205053, No. 20, Nov. 1993 & JP 5 078 556, Mar. 30, 1993.
Database WPI Week 8826, Derwent Pub. Ltd., & JP 63 113 056, May 18, 1988.

*Primary Examiner*—Tae Yoon
*Attorney, Agent, or Firm*—Birch, Stewart, Kolasch & Birch, LLP

[57] ABSTRACT

The present invention provides a liquid crystal polyester resin composition, which is manufactured at low cost and has favorable gas barrier properties and improved impact resistance, vibration-damping properties, thin-wall properties (mechanical properties of thin-wall molded articles), and film-forming properties, while maintaining excellent heat resistance and mechanical properties of a liquid crystal polyester. The liquid crystal polyester resin composition of the invention includes 55.0 through 99.9 percent by weight of a liquid crystal polyester as a component (A), and 0.1 through 45.0 percent by weight of an epoxy group-containing ethylene copolymer as a component (B), wherein the component (B) includes: (a) 50 through 96.5 percent by weight of an ethylene unit; (b) 0.5 through 30 percent by weight of an unsaturated glycidyl carboxylate unit or an unsaturated glycidyl ether unit; and (c) 3 through 40 percent by weight of an ethylenically unsaturated ester compound unit.

10 Claims, 1 Drawing Sheet

LIQUID CRYSTAL POLYESTER RESIN COMPOSITION

This application is a continuation of application Ser. No. 08/405,186 filed on Mar. 16, 1995, now abandoned.

BACKGROUND OF THE INVENTION

1. Field of the Invention

The present invention relates with respect to a liquid crystal polyester resin composition applicable to molded articles prepared by injection molding or extrusion molding.

2. Description of the Related Art

Unlike crystalline polyesters such as polyethylene terephthalate and polybutylene terephthalate, a liquid crystal polyester consisting of rigid molecules does not become entangled even under the melting condition, but forms a polydomain in a liquid crystal state and has low shear properties to realize a remarkably high orientation of molecular chains towards the flow. The liquid crystal polyester is one example of thermotropic liquid crystal polymers. This specific behavior causes excellent melt flow properties and gives thin-wall molded articles of 0.2 through 0.5 mm in thickness having high strength and high rigidity. Molded articles of a liquid crystal polyester, on the other hand, have various disadvantages, including extremely large anisotropy and insufficient vibration-damping properties. The high molding temperature and high manufacturing cost of a liquid crystal polyester undesirably restrict its applications to various fields.

In the market, there has been a growing demand for an improved liquid crystal polyester resin composition, which is manufactured at low cost and realizes improved vibration-damping properties and anisotropy of molded articles while maintaining excellent heat resistance and mechanical properties of a liquid crystal polyester.

A resin composition disclosed in JAPANESE PATENT LAYING-OPEN GAZETTE No. S-56-115357 includes a melt processable polymer and an anisotropic melt processable polymer. The processabilities of a melt processable polymer have been enhanced by mixing an anisotropic melt processable polymer with the melt processable polymer. An example of such resin compositions is a mixture of polyphenylene ether and polystyrene blended with a liquid crystal polyester.

Another resin composition disclosed in JAPANESE PATENT LAYING-OPEN GAZETTE No. H-2-97555 is prepared by mixing a variety of polyarylene oxides with a liquid crystal polyester to improve the solder heat resistance.

Any conventional resin composition prepared by mixing a liquid crystal polyester of a high molding temperature with a non-crystalline polymer of a lower molding temperature, such as polyphenylene ether, results in poor appearance of molded articles due to pyrolysis of the resin mixture during the high-temperature molding while having the improved melt processability. Other drawbacks include insufficient heat resistance, mechanical properties, and impact resistance of the resulting composition.

Proposed resin compositions including a liquid crystal polyester and an aromatic polycarbonate, as disclosed in JAPANESE PATENT LAYING-OPEN GAZETTES No. S-57-40551 and No. H-2-102257, do not have sufficient heat resistance or mechanical properties.

Another known composition prepared by blending a liquid crystal polymer with epoxy rubber disclosed in the U.S. Pat. No. 5,216,073 also has insufficient heat resistance and mechanical properties.

Other proposed compositions prepared by mixing a thermoplastic resin with a liquid crystal polymer, as disclosed in JAPANESE PATENT LAYING-OPEN GAZETTES No. S-58-201850, No. H-1-121357, and No. H-1-193351, do not have favorable properties.

SUMMARY OF THE INVENTION

The object of the invention is to provide a liquid crystal polyester resin composition, which is manufactured at low cost and has favorable gas barrier properties and improved impact resistance, vibration-damping properties, thin-wall properties (mechanical properties of thin-wall molded articles), and film-forming properties, while maintaining excellent heat resistance and mechanical properties of a liquid crystal polyester.

The above and the other related objects are realized by a liquid crystal polyester resin composition including 55.0 through 99.9 percent by weight of a liquid crystal polyester as a component (A) and 0.1 through 45.0 percent by weight of an epoxy group-containing ethylene copolymer as a component (B). The component (B) specifically includes:

(a) 50 through 96.5 percent by weight of an ethylene unit;

(b) 0.5 through 30 percent by weight of an unsaturated glycidyl carboxylate unit or an unsaturated glycidyl ether unit; and (c) 3 through 40 percent by weight of an ethylenically unsaturated ester compound unit.

The liquid crystal polyester of component (A) may be obtained through a reaction of an aromatic dicarboxylic acid, an aromatic diol, and an aromatic hydroxycarboxylic acid or through a reaction of different aromatic hydroxycarboxylic acids.

The liquid crystal polyester of component (A) may consist of repeat units given as Chemical Formulae 1 or Chemical Formulae 2 below:

[Chemical Formulae 1]

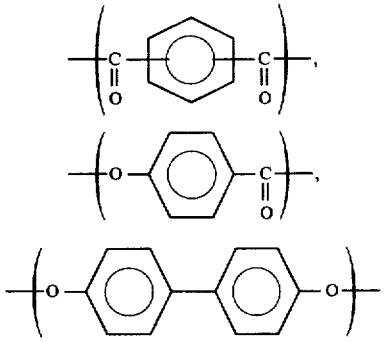

[Chemical Formulae 2]

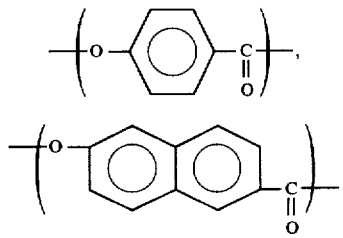

It is preferable that the epoxy group-containing ethylene copolymer of component (B) has a stiffness modulus in a range of 10 through 1,300 kg/cm$^2$.

The liquid crystal polyester resin composition has a melt viscosity ratio (melt viscosity 2/melt viscosity 1) of 0.1 through 0.7 being measured at a shear rate of either 100 sec$^{-1}$ or 1000 sec$^{-1}$, said melt viscosity 1 being measured at a flow temperature and said melt viscosity 2 being measured at a temperature of 20° C. higher than said flow temperature.

The flow temperature initiates formation of an anisotropic melt phase and gives a melt viscosity of 48,000 poise when a resin heated at a rate of 4° C./minute is extruded from a nozzle having an inner diameter of 1 mm and length of 10 mm under a load of 100 Kgf/cm$^2$.

It is preferable that the flow temperature of the liquid crystal polyester resin composition is higher than a flow temperature of the liquid crystal polyester of component (A).

DETAILED DESCRIPTION OF THE INVENTION

The liquid crystal polyester of component (A) included in the liquid crystal polyester resin composition according to the invention is a thermotropic liquid crystal polymer. The liquid crystal polyester of component (A) may be obtained through one of the following reactions, which form an anisotropic melt at the temperature equal to or lower than 400° C.:

(1) a reaction of an aromatic dicarboxylic acid, an aromatic diol, and an aromatic hydroxycarboxylic acid;

(2) a reaction of different aromatic hydroxycarboxylic acids;

(3) a reaction of an aromatic dicarboxylic acid and a nuclear substituted aromatic diol; and (4) a reaction of an aromatic hydroxycarboxylic acid and a polyester, such as polyethylene terephthalate.

The aromatic dicarboxylic acid, the aromatic diol, and the aromatic hydroxycarboxylic acid may be replaced by ester derivatives thereof. Exemplified repeat units of the liquid crystal polyester are given below although the liquid crystal polyester is not limited to these structures. Repeat units originating from aromatic dicarboxylic acids:

[Chemical Formulae 3]

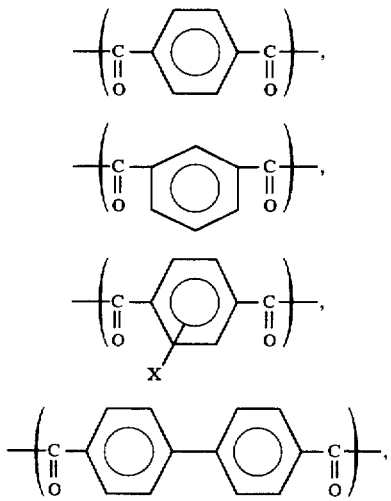

where X denotes a halogen, alkyl, or aryl.

[Chemical Formulae 4]

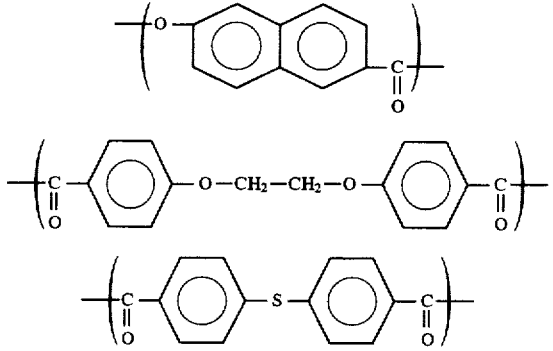

Repeat units originating from aromatic diols:

[Chemical Formulae 5]

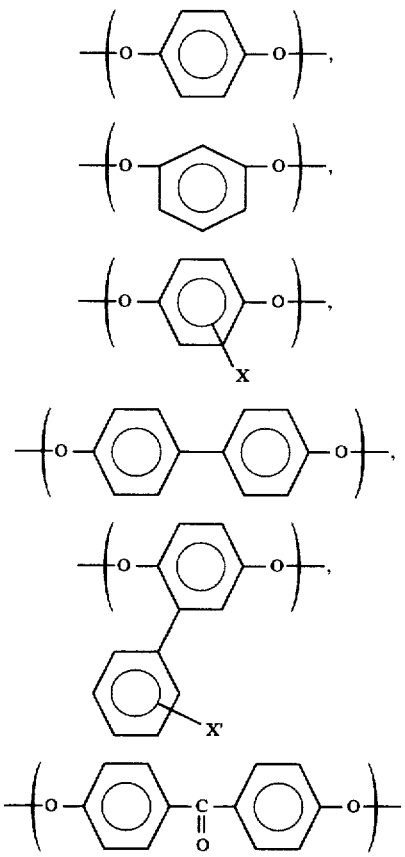

where X denotes a halogen, alkyl or aryl; X' denotes a halogen or alkyl.

[Chemical Formulae 6]

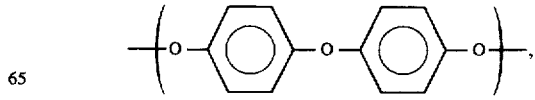

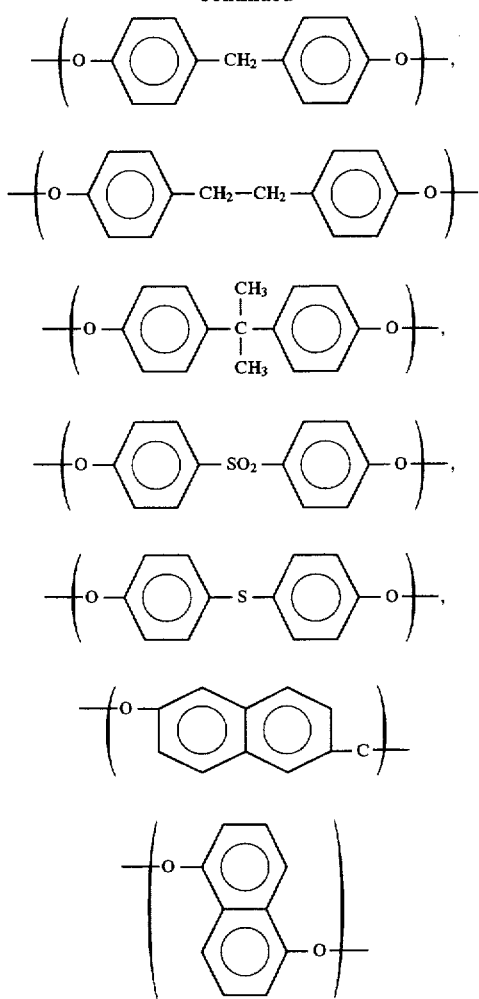

Repeat units originating from aromatic hydroxycarboxylic acids:

[Chemical Formulae 7]

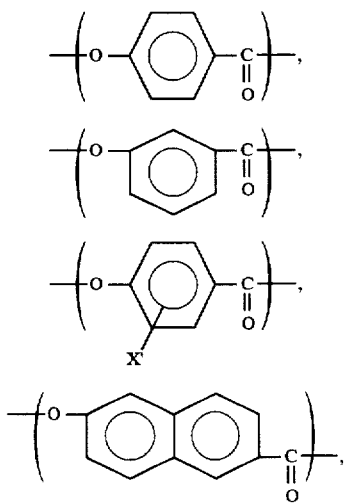

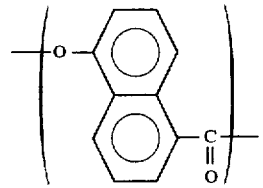

where X' denotes a halogen or alkyl.

The liquid crystal polyester consisting of repeat units given as Chemical Formula 8 below has well-balanced heat resistance, mechanical properties and melt processabilities, and is preferably applied to the invention:

[Chemical Formulae 8]

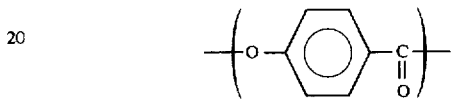

More concretely, the liquid crystal polyester preferably has one of the following combinations of repeat units (I) through (V):

[Chemical Formulae 9]

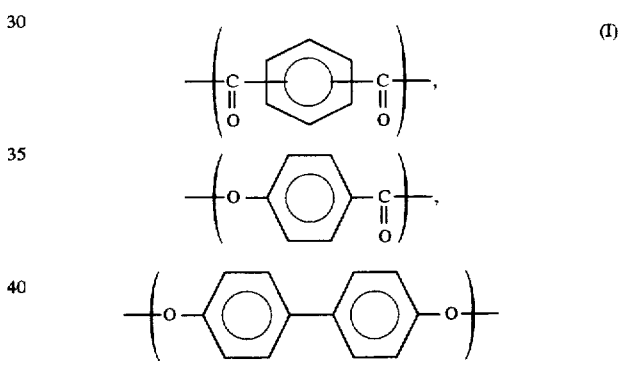
(I)

[Chemical Formulae 10]

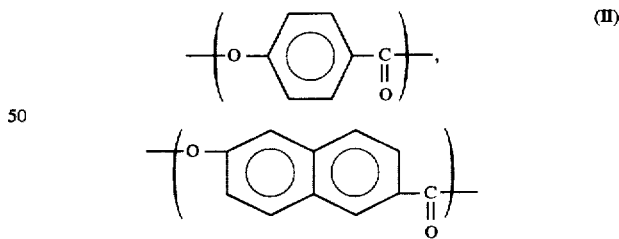
(II)

[Chemical Formulae 11]

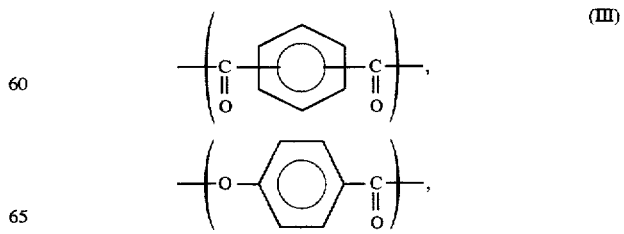
(III)

[Chemical Formulae 12]

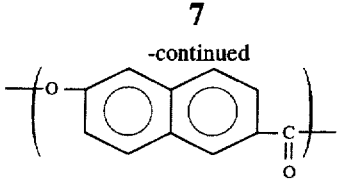

[Chemical Formulae 13]

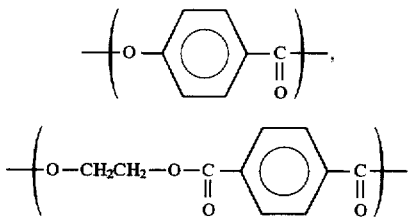

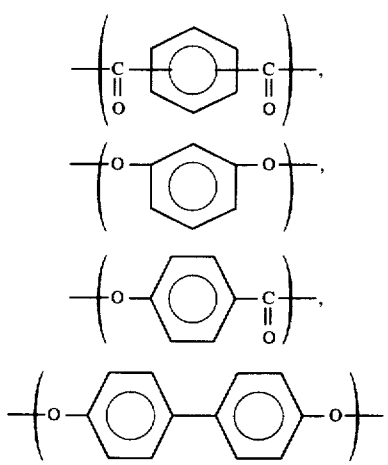

The liquid crystal polyesters (I), (II), (III), and (IV) are specified, for example, in JAPANESE PATENT PUBLICATION GAZETTES No. S-47-47870, No. S-63-3888, No. S-63-3891, and No. S-56-18016, respectively. The repeat unit combinations (I) and (II) are especially preferable among the above structures.

For application of the liquid crystal polyester resin composition according to the invention to fields with a requirement of high heat resistance, the liquid crystal polyester of component (A) preferably includes 30 through 80 percent of a repeat unit (a'), 0 through 10 percent of a repeat unit (b'), 0 through 25 percent of a repeat unit (c'), and 10 through 35 percent of a repeat unit (d') in molar fractions.

[Chemical Formulae 14]

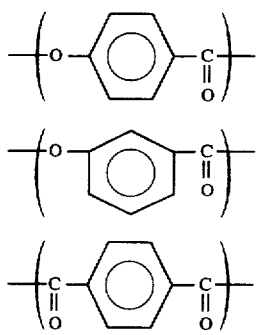

-continued

+O—Ar—O+  (d')

where Ar represents a divalent aromatic group.

The inherent viscosity (ηinh) of the liquid crystal polyester applied to the invention is measured in the following manner: dissolving 0.1 g of the liquid crystal polyester in 10 cc of 2,3,5,6-tetrachlorophenol and measuring the inherent viscosity ηinh at 60° C. with an Ubbellohde viscometer.

The inherent viscosity (ηinh) of the liquid crystal polyester applied to the invention ranges from 1.0 to 8.0 or more specifically from 2.0 to 6.0. When the inherent viscosity ηinh of the liquid crystal polyester is out of the above range, the resin composition obtained has poor processabilities, mechanical properties, and heat resistance.

The epoxy group-containing ethylene copolymer included as the component (B) in the liquid crystal polyester resin composition of the invention includes:

(a) 50 through 96.5 percent by weight of an ethylene unit;

(b) 1.0 through 30 percent by weight or more preferably 0.5 through 20 percent by weight of an unsaturated glycidyl carboxylate unit or an unsaturated glycidyl ether unit; and (c) 3 through 40 percent by weight of an ethylenically unsaturated ester compound unit.

In the epoxy group-containing ethylene copolymer of component (B), compounds expressed as Chemical Formula 15 and Chemical Formula 16 yield the constituent (b), the unsaturated glycidyl carboxylate unit or the unsaturated glycidyl ether unit.

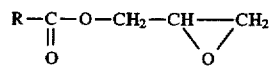

where R represents a hydrocarbon group having an unsaturated ethylene bond and containing 2 through 13 carbon atoms.

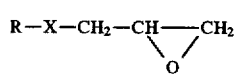

where R represents a hydrocarbon group having an unsaturated ethylene bond and containing 2 through 18 carbon atoms, and X denotes —CH$_2$—O— or a group given below:

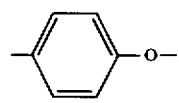

Concrete examples include glycidyl acrylate, glycidyl methacrylate, glycidyl itaconate, allyl glycidyl ether, 2-methylallyl glycidyl ether, and styrene-p-glycidyl ether.

The epoxy group-containing ethylene copolymer of component (B) according to the invention is a terpolymer or another copolymer containing ethylene, unsaturated glycidyl carboxylate or unsaturated glycidyl ether, and ethylenically unsaturated ester compound.

Examples of ethylenically unsaturated ester compounds giving the constituent (c) include vinyl carboxylates, such as vinyl acetate and vinyl propionate, and unsaturated α,β-alkyl carboxylates, such as methyl acrylate, ethyl acrylate, butyl acrylate, methyl methacrylate, ethyl methacrylate, and butyl methacrylate. Vinyl acetate, methyl acrylate, and ethyl acrylate are especially preferable.

Examples of the epoxy group-containing ethylene copolymer of component (B) applied to the invention include ethylene-glycidyl methacrylate-methyl methacrylate terpolymer, ethylene-glycidyl methacrylate-methyl acrylate terpolymer, ethylene-glycidyl methacrylate-ethyl acrylate terpolymer, and ethylene-glycidyl methacrylate-vinyl acetate terpolymer.

The epoxy group-containing ethylene copolymer included as the component (B) in the liquid crystal polyester resin composition of the invention includes:

(a) 50 through 96.5 percent by weight of an ethylene unit;

(b) 0.5 through 30 percent by weight of an unsaturated glycidyl carboxylate unit or an unsaturated glycidyl ether unit; and (c) 3 through 40 percent by weight of an ethylenically unsaturated ester compound unit.

The content of the ethylene unit (a) greater than 96.5 percent by weight undesirably lowers the impact resistance whereas the same less than 50 percent by weight results in a poor rigidity.

The content of the unsaturated glycidyl carboxylate unit or unsaturated glycidyl ether unit (b) greater than 30 percent by weight undesirably lowers the rigidity whereas the same less than 0.5 percent by weight gives a poor impact resistance.

The content of the ethylenically unsaturated ester compound unit greater than 40 percent by weight undesirably lowers the rigidity whereas the same less than 3 percent by weight causes a poor impact resistance.

The melt index (hereinafter may be referred to as MFR: measured at 190° C. under a load of 2.16 kg in conformity with JIS K6760) of the epoxy group-containing ethylene copolymer is in a range of 0.5 through 100 g/10 minutes or more preferably in a range of 2 through 50 g/10 minutes. The melt index greater than 100 g/10 minutes results in poor mechanical properties of the resulting resin composition while that less than 0.5 g/10 minutes lowers the compatibility with the liquid crystal polyester of component (A).

The epoxy group-containing ethylene copolymer of component (B) applied to the invention has stiffness modulus in a range of 10 through 1300 kg/cm² or more preferably in a range of 20 through 1100 kg/cm². The stiffness modulus out of the above range may result in insufficient processabilities and mechanical properties of the resulting resin composition.

The epoxy group-containing ethylene copolymer is prepared by copolymerizing an unsaturated epoxy compound and ethylene with a radical polymerization initiator at 500 through 4000 atm and 100 through 300° C. in the presence of or absence of an appropriate solvent and a chain transfer agent. Alternatively, a mixture of polyethylene and an unsaturated epoxy compound may be fused and graft-copolymerized in an extruder in the presence of a radical polymerization initiator.

The content of the component (A) included in the thermoplastic resin composition of the invention is 55.0 through 99.9 percent by weight or more preferably 65.0 through 99.0 percent by weight while the content of the component (B) is within a range of 0.1 through 45.0 percent by weight or more preferably in a range of 1.0 through 35.0 percent by weight.

The content of the component (A) less than 55.0 percent by weight lowers the heat resistance of the resulting resin composition, and the same greater than 99.9 percent by weight does not sufficiently improves the anisotropy and increases the cost.

The liquid crystal polyester resin composition of the invention may be manufactured by any known method. A typical method mixes the component (A) with the component (B) respectively dissolved in a solvent, and collects the resulting resin composition by evaporating the solvent or precipitating the resin composition. An industrially preferable method is to knead the components under the molten state. Known kneading apparatus including single screw extruders, twin-screw extruders, and various kneaders are applicable to the kneading process. Especially, biaxial high-speed kneaders are preferably applied.

For the kneading process, the temperature in the cylinder of the kneading machine is set in a range of 200 through 360° C. or more specifically in a range of 230 through 350° C.

Each component may be pre-mixed to the homogeneous state with a tumbling mixer or Henschel mixer. However, the components may be separately introduced quantitatively into a kneader without pre-mixing.

According to a typical method, the kneaded resin composition is formed to a predetermined shape by injection molding, extrusion molding, or another known molding process. Alternatively, molded articles may be obtained directly by dry blending the components and subsequently melt processing them by injection molding or extrusion molding.

An inorganic filler may be added to the liquid crystal polyester resin composition of the invention according to the requirements. Examples of the applicable inorganic filler include calcium carbonate, talc, clay, silica, magnesium carbonate, barium sulfate, titanium oxide, alumina, plaster, glass flakes, glass fibers, carbon fibers, alumina fibers, silica alumina fibers, aluminum borate whiskers, and potassium titanate fibers.

Various additives may also be added to the liquid crystal polyester resin composition of the invention according to the requirements in the preparation process or the subsequent melt processing process. Such additives include organic fillers, antioxidants, heat stabilizers, light stabilizers, flame retardants, lubricants, antistatic agents, inorganic or organic colorants, rust preventives, crosslinking agents, foaming agents, fluorescent agents, surface smoothing agents, surface gloss improvers, and mold release agents such as fluoropolymers.

Films formed from the liquid crystal polyester resin composition of the invention have excellent heat resistance and gas barrier properties.

It is generally preferable that the flow temperature of the liquid crystal polyester resin composition is higher than the flow temperature of the liquid crystal polyester of component (A). The resin composition having the flow temperature lower than that of the liquid crystal polyester may result in poor mechanical properties.

The liquid crystal polyester resin composition has a melt viscosity ratio (melt viscosity 2/melt viscosity 1) of 0.1 through 0.7 being measured at a shear rate of either 100 sec$^{-1}$ or 1000 sec$^{-1}$, said melt viscosity 1 being measured at a flow temperature and said melt viscosity 2 being measured at a temperature of 20° C. higher than said flow temperature.

For film formation, preferable range of the melt viscosity ratio of the liquid crystal polyester resin composition is between 0.1 and 0.7. The more preferable range of the melt viscosity ratio of the liquid crystal polyester resin composition is between 0.1 and 0.5. The melt viscosity ratio out of the above range lowers the film forming properties or results in the poor anisotropy and tensile strength of the resulting films.

The flow temperature initiates formation of an anisotropic melt phase and gives a melt viscosity of 48,000 poise when a resin heated at a rate of 4° C./minute is extruded from a nozzle having an inner diameter of 1mm and length of 10 mm under a load of 100 Kgf/cm$^2$.

The liquid crystal polyester resin composition of the invention is molded to films according to a known method.

The liquid crystal polyester resin composition of the invention has excellent vibration-damping properties, solder heat resistance, thin-wall properties, and film-forming properties as well as gives favorable gas barrier properties to the molded films, though the reasons for such improvement are not clearly elucidated. It is, however, assumed that chemical reaction of the liquid crystal polyester with the epoxy group-containing ethylene copolymer improves the compatibility of the liquid crystal polyester with the epoxy group-containing ethylene copolymer.

EXAMPLES

Figure 1:
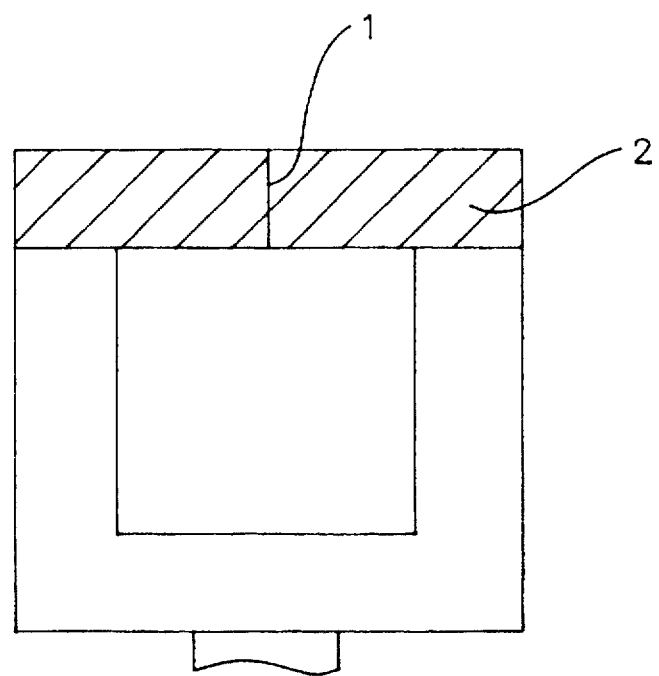
FIG. 1 shows a test piece applied to measurement of strengths at a welded portion and at a non-welded portion.

There may be many modifications, changes, and alterations without departing from the spirit and scope of essential characteristics of the invention, and the examples below are only illustrative and not restrictive in any sense.

(1) Measurement of Properties

Flow temperature:

The flow temperature was measured with a flow tester CFT-500 (manufactured by Shimadzu Corp). The flow temperature was measured as a temperature giving a melt viscosity of 48,000 poise when a resin heated at a rate of 4° C./minute was extruded from a nozzle having an inner diameter of 1 mm and length of 10 mm under a load of 100 Kgf/cm$^2$.

Melt Viscosity:

The melt viscosity was measured at shear rates of 100 sec$^{-1}$ and 1000 sec$^{-1}$ with Capillograph 1B (diameter of die: 0.5 mm) manufactured by Toyo Seiki Co., Ltd.

Tensile strength & Temperature of deflection under load (TDUL):

ASTM No. 4 tensile dumbbells and TDUL test samples (127 mm in length×12.7 mm in width×6.4 mm in thickness) were prepared, and the tensile strength and TDUL (under the load of 18.6 kg) were measured in conformity with ASTM (American Society for Testing and Materials) D638 and ASTM D648, respectively.

Izod impact strength:

The Izod impact strength was measured without notches for test samples (6.4 mm in thickness) at the ambient temperature and −40° C. according to JIS K7110.

Vibration-damping properties:

The viscoelasticity was measured for each injection molded article in an atmosphere of nitrogen at a heating rate of 5° C./min with a viscoelasticity measurement device DMA (manufactured by du Pont) according to the resonant frequency measurement process. Those having the high loss tangent (tan δ) were determined to have preferable vibration-damping properties.

Thin-wall properties:

Each composition was injection molded to dumbbell samples at a predetermined molding temperature and a predetermined die temperature with a die (wall thickness: 0.5 mm, length: 75 mm, width of neck: 5 mm). The tensile test was performed for the dumbbell samples to determine the elongation and tensile strength.

Thin-wall flow length:

Each composition was injected into a rectangular four-cavity mold (wall thickness: 0.3 mm, length: 46 mm, width: 5 mm) at 340° C. under a predetermined injection condition. The flow length of the composition along a longitudinal direction of each cavity was measured for the four cavities, and the mean value was calculated as the thin-wall flow length.

Strength at welded portion & Strength at non-welded portion:

Test pieces shown in FIG. 1 were formed from the respective compositions. Each test piece had the thickness of 3 mm, the outer diameter of 64 mm, and the inner diameter of 38 mm. A welded portion 2 (64×13 mm) including a weld line 1 (filled with slant lines in FIG. 1) was cut from the test piece, and the flexural strength was measured under the condition of the inter-span distance of 40 mm and the flexural rate of 2 mm/min.

A non-welded portion (64×13 mm) was also cut from the test piece and measured for the flexural strength.

Solder heat resistance:

JIS No. 1(1/2) Dumbbells of 0.8 mm in thickness were prepared and immersed in a solder bath containing 60% tin and 40% lead and heated to 260° C. After the immersion at the fixed temperature for 60 seconds, the dumbbells were taken out of the solder bath and observed with the naked eye. Similar experiments were carried out as the temperature of the solder bath was increased by 10° C. every time. The maximum temperature of the solder bath which did not cause foaming or deformation of the test pieces was determined. For example, when the test piece starts foaming or deformation at 310° C., the solder heat resistance is determined to be 300° C.

Appearance of film:

Films formed from the respective compositions were observed with the naked eye and evaluated according to the criteria below:

○: preferable appearance without any segregation or mottle; and

Δ: segregation or mottle observed.

Oxygen transmission rate of film:

The oxygen transmission rate was measured with oxygen gas at the temperature of 20° C. in conformity with the differential pressure method of JIS K7126.

Water vapor transmission rate of film:

The water vapor transmission rate was measured at the temperature of 40° C. and the relative humidity of 90% in conformity with the cup method of JIS Z0208.

The oxygen transmission rate and the water vapor transmission rate were converted to the film thickness of 25 μm.

(2) Liquid crystal polyester of component (A)

(i) A mixture containing 10.8 kg (60 mole) of p-acetoxybenzoic acid, 49 kg (15 mole) of terephthalic acid, 0.83 kg (5 mole) of isophthalic acid, and 5.45 kg (20.2 mole) of 4,4'-diacetoxydiphenyl was placed in a polymerization tank equiped with a comb-type agitator and stirred in an atmosphere of nitrogen upon continued heating to 330° C. The mixture was polymerized at 330° C. for one hour with vigorous stirring while acetic acid produced as a by-product was continuously removed. The system was gradually cooled to 200° C., at which the polymer obtained was taken out of the system.

The polymer obtained was ground to particles of not greater than 2.5 mm in diameter with a hammer mill (manufactured by Hosokawa Micron Co., Ltd). The polymer particles were treated in an atmosphere of nitrogen at 280° C. in a rotary kiln for three hours, so that granules of aromatic polyester (flow temperature: 324° C.) consisting of repeat units shown below were obtained. The liquid crystal polyester thus obtained was hereinafter referred to as A-1. The polymer showed optical anisotropy under the pressurizing condition at temperatures of not less than 340° C., and had the inherent viscosity ηinh of 2.5. The ratio of the repeat units of the polyester A-1 was given as:

[Chemical Formulae 18]

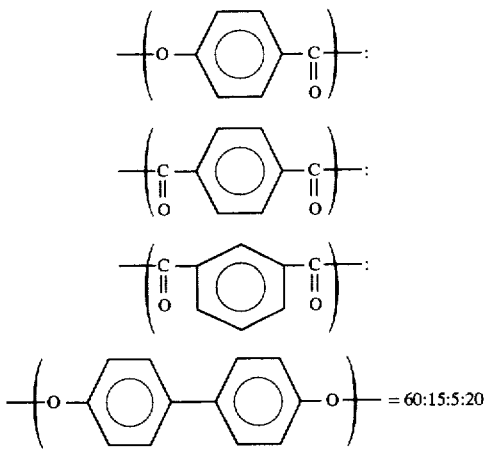

(ii) A mixture containing 16.6 kg (12.1 mole) of p-hydroxybenzoic acid, 8.4 kg (4.5 mole) of 6-hydroxy-2-naphthoic acid, and 18.6 kg (18.2 mole) of acetic anhydride was placed in a polymerization tank equiped with a comb-type agitator and stirred in an atmosphere of nitrogen upon continued heating to 320° C. The mixture was polymerized at 320° C. for one hour and under a reduced pressure of 2.0 torr at 320° C. for another one hour with vigorous stirring while acetic acid produced as a by-product was continuously removed from the system. The system was gradually cooled to 180° C., at which the polymer obtained was taken out of the system.

The polymer obtained was ground to particles in the same manner as the process (i) and treated in an atmosphere of nitrogen at 240° C. in a rotary kiln for five hours, so that granules of aromatic polyester (flow temperature: 270° C.) consisting of repeat units shown below were obtained. The liquid crystal polyester thus obtained was hereinafter referred to as A-2. The polymer showed optical anisotropy under the pressurizing condition at temperatures of not less than 280° C., and had the inherent viscosity ηinh of 5.1. The ratio of the repeat units of the polyester A-2 was given as:

[Chemical Formulae 19]

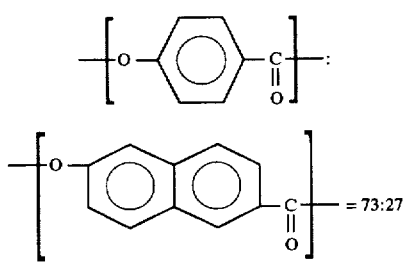

(3) Epoxy group-containing ethylene copolymer of component (B)

The following copolymers were used for the epoxy group-containing ethylene copolymer of component (B):

B-1: trade name Bondfast 7 L manufactured by Sumitomo Chemical Co., Ltd.
Composition: ethylene/glycidyl methacrylate/methyl acrylate=67/3/30 MFR (measured at 190° C. under the load of 2.16 kg)=9 g/10 minutes; stiffness modulus=60 kg/cm$^2$ B-2: trade name Bondfast 2 C manufactured by Sumitomo Chemical Co., Ltd.
Composition: ethylene/glycidyl methacrylate=94/6 MFR (measured at 190° C. under the load of 2.16 kg)=3 g/10 minutes; stiffness modulus=1,000 kg/cm$^2$ B-3: trade name Bondfast 20 B manufactured by Sumitomo Chemical Co., Ltd.
Composition: ethylene/glycidyl methacrylate/vinyl acetate=83/12/5 MFR (measured at 190° C. under the load of 2.16 kg)=20 g/10 minutes; stiffness modulus=430 kg/cm$^2$ Examples 1 through 5, References 1 & 2

The respective components and a stabilizer were blended with a Henschel mixer according to the compositions shown in Tables 1 and 3. Each composition was kneaded at the cylinder temperature of 327° C. with a twin-screw extruder PCM-30 (manufactured by Ikegai Tekko Co., Ltd). The kneaded composition was injection molded to an article with an injection molding device PS40E5ASE (manufactured by Nissei Resin Industries Co., Ltd.) at the molding temperature of 347° C. and the die temperature of 80° C. The properties of each molded article were measured, and the results of measurement are shown in Tables 1 and 3.

Each composition obtained as above was also extrusion molded to a film by a single screw extruder VS20-20 (manufactured by Tanabe Plastics Co., Ltd.) with a T-die. The composition was extruded from the T-die having the slit width of 10 cm and the slit interval of 0.7 mm under the conditions of the cylinder temperature of 350° through 360° C. and the screw speed of 80 rpm. The film wound up at the rate of 4 m/min had the thickness of 20 through 50 µm. The properties of each film were measured, and the results of measurement are shown in Table 3.

Example 6, References 3 & 4

The respective components and a stabilizer were blended with a Henschel mixer according to the compositions shown in Tables 2 and 4. Each composition was kneaded at the cylinder temperature of 257° C. with a twin-screw extruder PCM-30 (manufactured by Ikegai Tekko Co., Ltd). The kneaded composition was injection molded to an object with an injection molding device PS40E5ASE (manufactured by Nissei Resin Industries Co., Ltd.) at the molding temperature of 258° C. and the die temperature of 60° C. The properties of each molded object were measured, and the results of measurement are shown in Tables 2 and 4.

Each composition obtained as above was extrusion molded to a film in the same manner as above except that the temperature of cylinder in the extruder was set in a range of 280° through 310° C. The properties of each film were measured, and the results of measurement are shown in Table 4.

The liquid crystal polyester resin composition of the invention is manufactured at low cost and has favorable solder heat resistance, film-forming properties, and gas barrier properties as well as improved weld strength, vibration-damping properties, and thin-wall properties. The liquid crystal polyester resin composition is preferably applicable to various molded articles, such as sheets, tubes, films, fibers, laminates, and coating materials, prepared by injection molding or extrusion molding.

TABLE 1

| | Composition | | | Flow temperature (FT) (°C.) | Melt viscosity 1 Measured at FT | | Melt viscosity 2 Measured at FT + 20° C. | | Melt viscosity ratio Melt viscosity 2 / Melt viscosity 1 | |
|---|---|---|---|---|---|---|---|---|---|---|
| | Component A | Component B | Another component | | 100 sec$^{-1}$ | 1000 sec$^{-1}$ | 100 sec$^{-}$ | 1000 sec$^{-}$ | 100 sec$^{-1}$ | 1000 sec$^{-1}$ |
| | Percent by weight | | | | Poise | | Poise | | | |
| Example 1 | (A-1) 98 | (B-1) 2 | 0 | 321 | 48000 | 8200 | 4900 | 1000 | 0.102 | 0.122 |
| Example 2 | (A-1) 95 | (B-1) 5 | 0 | 321 | 47000 | 8400 | 5500 | 1200 | 0.111 | 0.143 |
| Example 3 | (A-1) 90 | (B-1) 10 | 0 | 322 | 44000 | 7800 | 6300 | 1400 | 0.143 | 0.179 |
| Example 4 | (A-1) 80 | (B-1) 20 | 0 | 326 | 42000 | 7400 | 7600 | 1800 | 0.181 | 0.250 |
| Example 5 | (A-1) 70 | (B-1) 30 | 0 | 332 | 37000 | 6800 | 9500 | 2150 | 0.257 | 0.316 |
| Reference 1 | (A-1) 100 | 0 | 0 | 320 | 48000 | 8200 | 3000 | 700 | 0.063 | 0.085 |
| Reference 2 | (A-1) 80 | 0 | 20*¹ | 245 | 23000 | 4200 | 18000 | 3400 | 0.783 | 0.810 |

*¹Low-density Polyethylene, Sumikathene F-101 (Registered Trademark); Manufactured by Sumitomo Chemical Co., Ltd. (Stiffness modulus = 2300 kg/cm²)

TABLE 2

| | Composition | | | Flow temperature (FT) (°C.) | Melt viscosity 1 Measured at FT | | Melt viscosity 2 Measured at FT + 20° C. | | Melt viscosity ratio Melt viscosity 2 / Melt viscosity 1 | |
|---|---|---|---|---|---|---|---|---|---|---|
| | Component A | Component B | Another component | | 100 sec$^{-1}$ | 1000 sec$^{-1}$ | 100 sec$^{-}$ | 1000 sec$^{-}$ | 100 sec$^{-1}$ | 1000 sec$^{-1}$ |
| | Percent by weight | | | | Poise | | Poise | | | |
| Reference 3 | (A-2) 92 | (B-2) 8 | 0 | 265 | 42000 | 7600 | 8500 | 1800 | 0.202 | 0.237 |
| Example 6 | (A-2) 80 | (B-3) 20 | 0 | 266 | 41000 | 7200 | 13000 | 3000 | 0.317 | 0.416 |
| Reference 4 | (A-2) 100 | 0 | 0 | 263 | 56000 | 9200 | 4900 | 1500 | 0.088 | 0.163 |

TABLE 3

| | Properties | | | | | | | | Thin-wall properties | | | | |
|---|---|---|---|---|---|---|---|---|---|---|---|---|---|
| | Tensile test | | | Izod impact strength | | Tan δ | | | | | Thin-wall flow length | Strength at non-welded portion | Strength at welded portion | Solder heat resistance |
| | Elongation | Tensile strength at break | TDUL | r.t. | −40° C. | 25° C. | 150° C. | Elongation | Tensile strength at break | (340° C., mm) | (kg/cm²) | (kg/cm²) | (°C.) |
| | (%) | (kg/cm²) | (°C.) | (kg · cm/cm) | | | | (%) | (kg/cm²) | | | | |
| Example 1 | 7.5 | 1700 | 259 | 83 | 27 | 0.08 | 0.06 | 9.0 | 3040 | 177 | 740 | 250 | 300 |
| Example 2 | 7.8 | 1730 | 254 | 86 | 29 | 0.08 | 0.07 | 9.4 | 3090 | 184 | 730 | 290 | 290 |
| Example 3 | 10.1 | 1990 | 243 | No breakage | 33 | 0.07 | 0.09 | 9.1 | 3000 | 191 | 700 | 320 | 290 |
| Example 4 | 10.4 | 1360 | 238 | 56 | 35 | 0.11 | 0.12 | 8.6 | 2350 | 150 | 610 | 310 | 290 |
| Example 5 | 9.4 | 990 | 215 | 43 | 29 | 0.12 | 0.14 | 8.2 | 1760 | 103 | 520 | 300 | 280 |

TABLE 3-continued

| | | | | | | | | | | | | | |
|---|---|---|---|---|---|---|---|---|---|---|---|---|---|
| Reference 1 | 5.2 | 1620 | 265 | 70 | 30 | 0.04 | 0.03 | 4.0 | 3060 | 162 | 780 | 200 | 300 |
| Reference 2 | 1.2 | 790 | 201 | 7 | 2 | 0.03 | 0.02 | 2.1 | 1040 | 85 | 460 | 250 | 260 |

| | Film properties | | |
|---|---|---|---|
| | Appearance of film | Water vapor transmission rate (g/m² · 24 hr · atm) | Oxygen transmission rate (cc/m² · 24 hr · atm) |
| Example 1 | Δ | 0.3 | 0.3 |
| Example 2 | ○ | 0.4 | 0.3 |
| Example 3 | ○ | 0.3 | 0.2 |
| Example 4 | ○ | 0.4 | 0.4 |
| Example 5 | ○ | 0.5 | 0.4 |
| Reference 1 | No film formed | — | — |
| Reference 2 | No film formed | — | — |

TABLE 4

| | Properties | | | | | | | | | |
|---|---|---|---|---|---|---|---|---|---|---|
| | Tensile test | | | | | | Thin-wall properties | | Strength at non-welded portion | Strength at welded portion |
| | Elongation | Tensile strength at break | TDUL | Izod impact strength | | Tan δ | | Elongation | Tensile strength at break | | |
| | (%) | (kg/cm²) | (°C.) | r.t. (kg · cm/cm) | −40°C. | 25° C. | 150° C. | (%) | (kg/cm²) | (kg/cm²) | (kg/cm²) |
| Reference 3 | 13.7 | 1990 | 180 | No breakage | 15 | 0.08 | 0.09 | 12.4 | 1830 | 780 | 280 |
| Example 6 | 12.8 | 1280 | 158 | 86 | 32 | 0.10 | 0.11 | 10.8 | 1770 | 670 | 300 |
| Reference 4 | 11.5 | 1740 | 183 | 71 | 31 | 0.02 | 0.02 | 6.9 | 1970 | 920 | Cracking (not measured) |

| | Film properties | | |
|---|---|---|---|
| | Appearance of film | Water vapor transmission rate (g/m² · 24 hr · atm) | Oxygen transmission rate (cc/m² · 24 hr · atm) |
| Reference 3 | Δ | 0.4 | 0.3 |
| Example 6 | ○ | 0.4 | 0.4 |
| Reference 4 | No film formed | — | — |

What is claimed is:

1. A liquid crystal polyester resin composition consisting of 65 through 99 percent by weight of a liquid crystal polyester as a component (A), and 1 through 35 percent by weight of an epoxy group-containing ethylene copolymer as a component (B), said component (B) comprising:

(a) 50 through 96.5 percent by weight of an ethylene unit;

(b) 0.5 through 30 percent by weight of an unsaturated glycidyl carboxylate unit or an unsaturated glycidyl ether unit; and (c) 3 through 40 percent by weight of an ethylenically unsaturated ester compound unit, wherein said liquid crystal polyester of component (A) is a member selected from the group consisting of repeat units (I)–and (V):

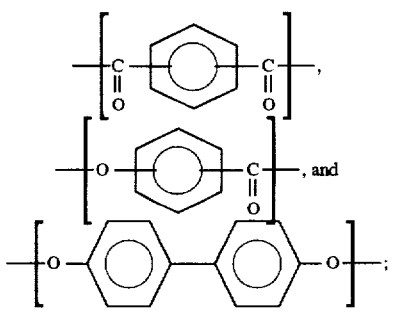
(I)

-continued

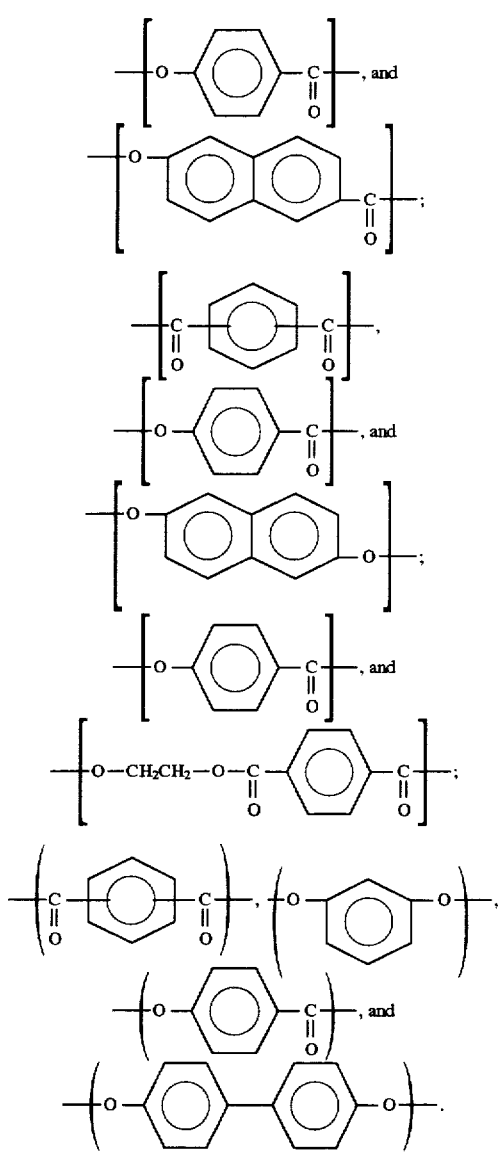

2. A liquid crystal polyester resin composition according to claim 1, wherein said liquid crystal polyester of component (A) is a member selected from the group consisting of repeat units I, III and V.

3. A liquid crystal polyester resin composition according to claim 1, wherein said liquid crystal polyester of component (A) is a member selected from the group consisting of repeat units II and IV.

4. A liquid crystal polyester resin composition according to claim 1, wherein said liquid crystal polyester of component (A) is a repeat units I.

5. A liquid crystal polyester resin composition according to claim 1, wherein said liquid crystal polyester of component (A) is a repeat units II.

6. A liquid crystal polyester resin composition according to claim 1, wherein said epoxy group-containing ethylene copolymer of component (B) has a stiffness modulus in a range of 10 through 1,300 kg/cm².

7. A liquid crystal polyester resin composition according to claim 1, wherein the melt viscosity ratio (melt viscosity 2/melt viscosity 1) of said liquid crystal polyester resin composition being measured at a shear rate of either 100 sec⁻¹ or 1000 sec⁻¹ is in a range of 0.1 through 0.7, said melt viscosity 1 being measured at a flow temperature and said melt viscosity 2 being measured at a temperature of 20° C. higher than said flow temperature.

8. A liquid crystal polyester resin composition according to claim 1, wherein said liquid crystal polyester of component (A) has an inherent viscosity ηinh of 1.0 through 8.0.

9. A liquid crystal polyester resin composition according to claim 1, wherein the flow temperature of said liquid crystal polyester resin composition is higher than a flow temperature of said liquid crystal polyester of component (A).

10. A liquid crystal polyester resin composition consisting essentially of 65 through 99 percent by weight of a liquid crystal polyester as a component (A), and 1 through 35 percent by weight of an epoxy group-containing ethylene copolymer as a component (B), said component (B) comprising:

(a) 50 through 96.5 percent by weight of an ethylene unit;

(b) 0.5 through 30 percent by weight of an unsaturated glycidyl carboxylate unit or an unsaturated glycidyl ether unit; and (c) 3 through 40 percent by weight of an ethylenically unsaturated ester compound unit, wherein said liquid crystal polyester of component (A) is a member selected from the group consisting of repeat units (I)–and (V):

and

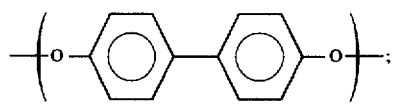

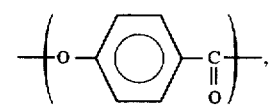

and

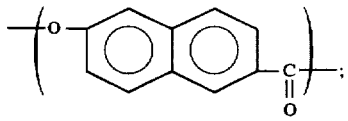

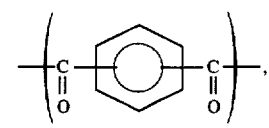

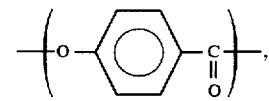

and
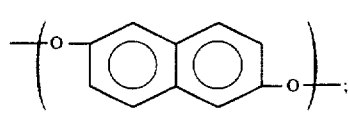
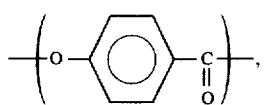
and
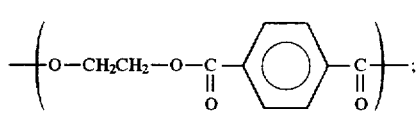
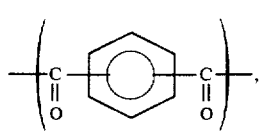
(IV)
(V)
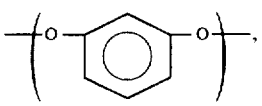
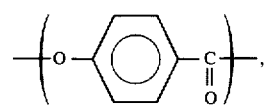
and
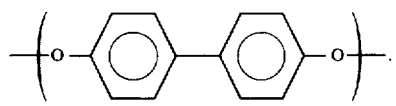
* * * * *